US012607885B2

(12) United States Patent
Hosseini et al.

(10) Patent No.: US 12,607,885 B2
(45) Date of Patent: Apr. 21, 2026

(54) DISPLAY DEVICE

(71) Applicant: E INK CORPORATION, Billerica, MA (US)

(72) Inventors: Peiman Hosseini, London (GB); Clement Talagrand, Chamrousse (FR); Noboru Yamada, Osaka (JP)

(73) Assignee: E Ink Corporation, Billerica, MA (US)

( * ) Notice: Subject to any disclaimer, the term of this patent is extended or adjusted under 35 U.S.C. 154(b) by 613 days.

(21) Appl. No.: 17/917,697

(22) PCT Filed: Mar. 5, 2021

(86) PCT No.: PCT/GB2021/050549
§ 371 (c)(1),
(2) Date: Oct. 7, 2022

(87) PCT Pub. No.: WO2021/205138
PCT Pub. Date: Oct. 14, 2021

(65) Prior Publication Data
US 2023/0152610 A1     May 18, 2023

(30) Foreign Application Priority Data
Apr. 10, 2020     (GB) ...................................... 2005350

(51) Int. Cl.
*G02F 1/01*         (2006.01)
*G02F 1/19*         (2019.01)
(52) U.S. Cl.
CPC .............. *G02F 1/0147* (2013.01); *G02F 1/19* (2013.01)

(58) Field of Classification Search
CPC ... G02F 1/01; G02F 1/015; G02F 1/19; G02F 1/0147
See application file for complete search history.

(56) References Cited

U.S. PATENT DOCUMENTS 9,323,044 B2     4/2016   Feenstra et al.
9,823,538 B2     11/2017  Bhaskaran et al.
(Continued)

FOREIGN PATENT DOCUMENTS

EP          3333618 A1 *   6/2018   ........... G02B 6/0001
JP          2007095274 A   4/2007
WO          2015097469 A2  7/2015

OTHER PUBLICATIONS

Castillo, Sergio Garcia et al., "57-4: Solid State Reflective Display (SRD®) with LTPS Diode Backplane", SID Digest, vol. 50, No. 1, pp. 807-810 (2019).
(Continued)

*Primary Examiner* — Sharrief I Broome
*Assistant Examiner* — Journey F Sumlar
(74) *Attorney, Agent, or Firm* — Brian D. Bean

(57)          ABSTRACT

Display devices for displaying a pattern are disclosed. In one arrangement, a pixel element having a layered structure is provided. The layered structure comprises at least one phase change material layer thermally switchable between at least a stable high extinction coefficient state and a stable low extinction coefficient state. A ratio of a mean average over the visible spectrum of the extinction coefficient of the phase change material layer in the high extinction coefficient state to a mean average over the visible spectrum of the extinction coefficient of the phase change material layer in the low
(Continued)

extinction coefficient state is greater than 3.0. A mean average over the visible spectrum of the extinction coefficient in the high extinction state is less than 1.0.

17 Claims, 7 Drawing Sheets

(56) References Cited

U.S. PATENT DOCUMENTS

| | | | | |
|---|---|---|---|---|
| 10,068,606 | B2 | 9/2018 | Bhaskaran et al. | |
| 10,884,314 | B2 | 1/2021 | Broughton et al. | |
| 11,215,852 | B2 | 1/2022 | Hosseini et al. | |
| 11,320,647 | B2 | 5/2022 | Chou et al. | |
| 2006/0124892 | A1* | 6/2006 | Rolland | B32B 27/36 |
| | | | | 252/70 |
| 2014/0331711 | A1* | 11/2014 | Blezard | B65D 81/3813 |
| | | | | 62/457.2 |
| 2016/0334647 | A1 | 11/2016 | Lin et al. | |
| 2017/0031231 | A1* | 2/2017 | Bhaskaran | G02F 1/0105 |
| 2020/0124881 | A1 | 4/2020 | Hosseini | |
| 2020/0202804 | A1 | 6/2020 | Garcia et al. | |
| 2020/0209059 | A1 | 7/2020 | Sarwat et al. | |

OTHER PUBLICATIONS

Broughton, Ben et al., "38-4: Solid State Reflective Display (SRD®) Utilizing Ultrathin Phase-Change Materials", SID Digest, vol. 48, No. 1, pp. 546-549 (2017).
European Patent Office, "International Search Report and Written Opinion", PCT/GB2021/050549, Jun. 14, 2021.
Hosseini, Peiman et al., "An optoelectronic framework enabled by low-dimensional phase-change films", Nature, vol. 511, No. 7508, pp. 206-211, (Jul. 9, 2014).
Kaino, Yuriko et al., "Laser-addressed full-color photo-quality rewritable sheets based on thermochromic systems with euco dyes", J Soc Inf Display, vol. 27, No. 5, pp. 295-303, (Apr. 11, 2019).
Talagrand, Clement et al., "Solid-state reflective displays (SRD®) for video-rate, full color, outdoor readable displays", Journal of the Society for Information Display, vol. 26, No. 10, pp. 619-624, (Oct. 2018).
Rios, Carlos et al. "Color Depth Modulation and Resolution in Phase-Change Material Nanodisplays", Adv Mater, vol. 28, pp. 4720-4726 (2016).

* cited by examiner

DISPLAY DEVICE

RELATED APPLICATIONS

This application is a U.S. national-stage application filed under 35 U.S.C. § 371 from PCT/GB2021/050549, filed Mar. 5, 2021, which claims priority to GB 2005350.0, filed Apr. 10, 2020. All patents, patent applications, and publications disclosed herein are incorporated by reference in their entirety.

The present invention relates to display devices using phase change material (PCM).

PCM based reflective display devices in which an optical switching effect is thermally modulated are disclosed in WO2017134506A1 and related publications 'Garcia Castillo, S. et al., "57-4: Solid State Reflective Display (SRD®) with LTPS Diode Backplane", SID Digest, 50, 1, pp 807-810 (2019)' and 'Broughton, B. et al., "38-4: Solid-State Reflective Displays (SRD®) Utilizing Ultrathin Phase-Change Materials", SID Digest, 48, 1, pp 546-549 (2017)'.

A colour display can be provided by combining a layered structure with PCM and a shutter arrangement. The PCM can be switched between white and a colour, while the shutter arrangement can be switched between transparent and opaque. Combining the PCM and the shutter optically in series provides control of both colour and brightness. It would be desirable, however, to improve the optical performance and/or simplify the structure of displays based on PCM.

It is an object of the invention to improve the optical performance and/or simplify the structure of displays based on PCM.

According to an aspect, there is provided a display device for displaying a pattern, comprising: a pixel element having a layered structure, the layered structure comprising at least one phase change material layer thermally switchable between at least a stable high extinction coefficient state and a stable low extinction coefficient state, wherein, for each phase change material layer: a ratio of a mean average over the visible spectrum of the extinction coefficient of the phase change material layer in the high extinction coefficient state to a mean average over the visible spectrum of the extinction coefficient of the phase change material layer in the low extinction coefficient state is greater than 3.0; and a mean average over the visible spectrum of the extinction coefficient in the high extinction state is less than 1.0.

Thus a display device is provided which uses a PCM having a very low extinction coefficient in one of its stable states (the low extinction coefficient state). Having a very low extinction coefficient means the PCM is highly transparent in that stable state, without the PCM layer needing to be undesirably thin. The PCM has minimal effect on the brightness (reflectivity) of the pixel element when in this stable state. In contrast, when the PCM is in at least one of the other stable states (the high extinction coefficient state) the extinction coefficient is markedly higher (at least three times higher). This allows the same PCM to provide near opaque behaviour (optionally in combination with other PCMs in the layered structure). The PCM thus allows high black/white contrast to be achieved without sacrificing the white state reflectivity of the pixel element (when configured to operate in a reflective mode) nor the colour gamut.

In an embodiment, the layered structure of the pixel element further comprises one or more further PCM layers each switchable between at least a high extinction coefficient state and a low extinction coefficient state. For each further PCM layer, a ratio of a mean average over the visible spectrum of the extinction coefficient of the PCM layer in the high extinction coefficient state to a mean average over the visible spectrum of the extinction coefficient of the further PCM layer in the low extinction coefficient state is greater than 3. Having one or both of the PCM layers able to be made highly transparent makes it possible to stack multiple PCM layers optically in series without losing colour vividness and/or brightness. It is therefore possible to provide a range of visual effects similar to what is achievable using a combination of a PCM and a shutter without having the shutter (e.g. a colour such as red, blue or green; white; and black).

In an embodiment, there is provided a switching arrangement capable of applying heating to the pixel element according to each of a plurality of different heating profiles. A heating profile may be provided that causes switching of a first of the PCM layers without switching of at least a second of the PCM layers in the pixel element. A different heating profile may be provided that causes switching of the second PCM layer in the pixel element without switching of the first PCM layer in the pixel element. Thus independent control of the different PCM layers is possible simply by changing the heating profile. The same switching element (e.g. heating element) can thus be used to switch both of the PCM layers. Each pixel element can thus be manufactured efficiently, as well as being made compact and reliable.

In an embodiment, two or more of the PCM layers differ from each other only by doping (e.g. a composition and/or level of doping). The different phase change materials can thus be provided using similar deposition techniques (and under similar conditions), as well as providing layers having similar structural and thermal properties (including similar thermal expansion coefficients), thereby improving device reliability and longevity. For example, doping can be done during deposition (for example adding nitrogen to the process gas) only when needed. A need for different target materials is avoided.

In an embodiment, the layered structure comprises two identical PCM layers and a different PCM layer positioned in between them. This arrangement has been found to provide particularly optimal performance. The arrangement can furthermore be configured to operate without additional passive spacer layers (e.g. between any of the PCM layers), thereby facilitating manufacture (e.g. fewer deposition steps).

In an embodiment, the first PCM layer and/or the second PCM layer comprises, consists essentially of, or consists of, one or more of the following in any combination: $Sb_2S_3$; $Ge_2Sb_2Se_4Te$; GeSbTeO; GeSnTeO; GeSnSbTeO; TeBiSnN; TeBiSnS; TeBiSnO; SeSnBi; SeSnBiO; SeSnGeO. The inventors have found that these materials provide a surprisingly good combination of performance characteristics.

In an embodiment, the device comprises a switching arrangement capable of applying heating from one and the same heating element to the pixel element according to each of a plurality of different heating profiles; and the plurality of heating profiles comprises at least two heating profiles that cause switching of a different proportion of the PCM in one of the PCM layers of the pixel element. Thus, the inventors have found that the heating profiles can be controlled to selectively switch different proportions of a PCM layer, thereby providing a further degree of freedom for providing a desired range of optical effects. In an embodiment, for example, a proportion of a PCM layer that is switched to a state with high extinction coefficient (e.g. a substantially optically opaque state) is controlled to vary a grayscale level (overall brightness) of a pixel unit.

According to an aspect, there is provided a display device for displaying a pattern, comprising: a pixel element having a layered structure comprising a phase change material layer switchable between at least a stable high extinction coefficient state and a stable low extinction coefficient state, a mean average over the visible spectrum of the extinction coefficient in the high extinction coefficient state being higher than a mean average over the visible spectrum of the extinction coefficient in the low extinction coefficient state; and a switching arrangement capable of applying heating from one and the same heating element to the pixel element according to each of a plurality of different heating profiles, wherein at least two of the heating profiles cause switching of a different proportion of the phase change material layer.

The invention will now be further described, by way of example, with reference to the accompanying drawings, in which.

Figure 1:
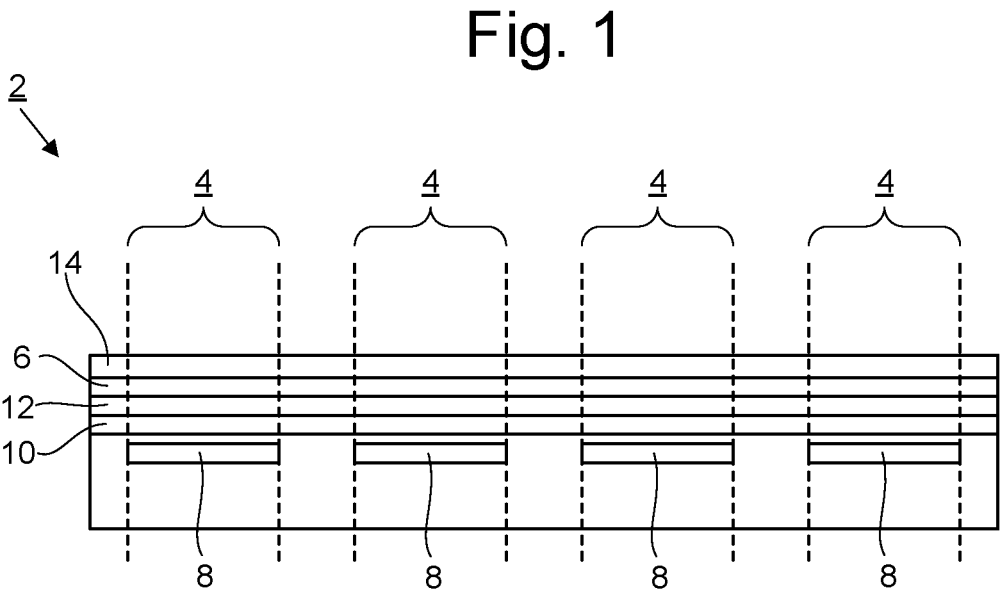
FIG. 1 is a schematic side sectional view of a portion of a display device comprising four example pixel elements that each have a layered structure.

FIG. 1 is a schematic side sectional view of a portion of a display device 2 to illustrate functionalities of the present disclosure. The device 2 is configured to display a pattern via a plurality of pixel elements 4. Each pixel element 4 is individually switchable between states having different refractive indices to define the pattern. The pattern may be a visible pattern (e.g. visible unaided by the human eye or via a microscope) or may be a machine-readable pattern (e.g. containing elements that are too small for the human eye or which need to be viewed using wavelengths of light that are not visible to the human eye). The pattern may define a picture, text or other visual information.

Each pixel element 4 comprises a layered structure. The layered structure comprises a plurality of layers, one on top of the other. The layered structure may comprise a thin film stack. The layered structure comprises at least one phase change material (PCM) layer 6. The PCM layer 6 is switchable between a stable high extinction coefficient state and a stable low extinction coefficient state. The high extinction coefficient state and the low extinction coefficient state are stable in the sense that no energy is required to hold the PCM in the state after switching. The high extinction coefficient state may be substantially crystalline, and the low extinction coefficient state may be substantially amorphous. The switching is achieved thermally. Thermal energy for the switching may be provided in various ways. Typically, an electrically powered heater is used to provide the thermal energy. In the example of FIG. 1, a heating element 8 is positioned in thermal contact with the layered structure of each pixel element 4. The heating element 8 may comprise a resistive heater. Each heating element 8 may be controllable independently of each other heating element 8. Each heating element 8 may thus be individually addressable. The individual addressability may be provided by any of various known techniques for driving individual pixels in an array of pixels. Each heating element 8 may, for example, comprise an electronic unit (e.g. a thin film electronic selector element such as a thin-film transistor or diode, typically formed for example from doped amorphous silicon, polysilicon or crystalline silicon) which, when addressed by signals from row and column lines intersecting at the electronic unit, drives the heating element 8. The signals may be generated by external control electronics. Switching of the pixel elements 4 may be performed sequentially and/or simultaneously in a controlled manner to define a desired pattern to be written to the display device. The plurality of heating elements 8 may be considered as an example of a switching arrangement capable of applying heating to the pixel elements 4.

The layered structure of each pixel element 4 may comprise layers additional to the PCM layer 6 that influence the optical effects achieved by the PCM, e.g. by interference effects. In an embodiment, all layers in the layered structure of each pixel element 4 are solid-state and configured so that their thicknesses as well as refractive index and absorption properties combine so that the different states of the PCM result in different, visibly and/or measurably distinct, reflection spectra. In an embodiment, the display device 2 is a reflective display. The display device 2 may therefore comprise a reflective layer 10. Where a plurality of the PCM layers 6 are provided, the reflective layer 10 is on one and the same side of each of the PCM layers 6. A passive (i.e. non-switchable) spacer layer 12 may be provided between the reflective layer 10 and at least one of the PCM layers 6. A capping layer 14 may be provided on an opposite side of each of the PCM layers 6 to the reflective layer 10. The spacer layer 12 and the capping layer 14 are both optically transmissive, and are ideally as transparent as possible.

Each of the capping layer 14 and spacer layer 12 may consist of a single layer or comprise multiple layers having different refractive indices relative to each other (i.e. where the capping layer 14 or spacer layer 12 consists of multiple layers at least two of those layers have different refractive indices relative to each other). The thickness and refractive index of the material or materials forming the capping layer 14 and/or spacer layer 12 are chosen to create a desired spectral response (via interference and/or absorption). Materials which may be used to form the capping layer 14 and/or spacer layer 12 may include (but are not limited to) ZnO, TiO$_2$, SiO$_2$, Si$_3$N$_4$, TaO, ITO, and ZnS—SiO$_2$.

Each of one or more of the layers in the layered structure of each pixel element 4 may optionally span across multiple pixel elements 4 to facilitate fabrication. Thus, one or more of the layers may be shared by different pixel elements 4. In the example of FIG. 1, all of the layers in the layered structures of the pixel elements 4 shown are shared between all of the pixel elements 4 shown. In other embodiments, each pixel element 4 may be provided with a layered structure that is discontinuous with the layered structure of each other pixel element 4 (e.g. each pixel element 4 may comprise a stack of layers that is separated from the stack of layers of each other pixel element 4 by a filler material).

In an embodiment, the extinction coefficient is at least three times higher (optionally at least four times higher, optionally at least five times higher, optionally at least 10 times higher), for most or all wavelengths in the visible range of light, in the high extinction coefficient state than in the low extinction coefficient state. In an embodiment, a ratio of a mean average over the visible spectrum of the extinction coefficient of the PCM layer 6 in the high extinction coefficient state to a mean average over the visible spectrum of the extinction coefficient of the PCM layer 6 in the low extinction coefficient state is greater than 3.0 (optionally greater than 4.0, optionally greater than 5.0, optionally greater than 7.5, optionally greater than 10.0). The extinction coefficient is herein understood to refer to the imaginary part of the refractive index. In addition to having the large difference between the extinction coefficients in the two stable states, the composition of the PCM layer 6 is selected so that the extinction coefficient in the high extinction coefficient state is limited to be no more than 1.0 on average. For example, a mean average over the visible spectrum of the extinction coefficient in the high extinction state is less than 1.0. The inventors have found that this combination of properties for the PCM layer 6 allow high black/white contrast to be achieved without sacrificing white state reflectivity or colour gamut, and without requiring that the PCM layer 6 is undesirably thin.

Figure 2:
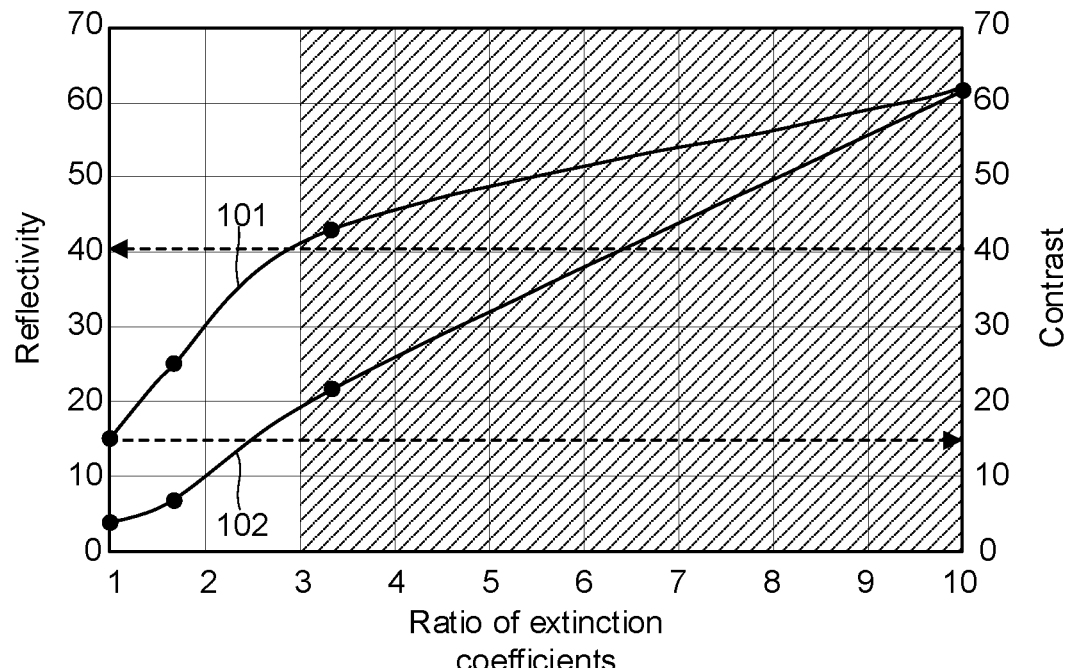
FIG. 2 is a graph depicting the result of simulations of the optical performance of a pixel element, including curves showing a variation of reflectivity and contrast as a function of a ratio of the extinction coefficients in each of two different states of the PCM.

The above-mentioned effects are illustrated in FIG. 2, which depicts the results of simulating the optical performance of a pixel element 4 having such a PCM layer 6. The graph depicts a simulated variation of reflectivity (left vertical axis; curve 101) and a simulated variation of contrast (right vertical axis; curve 102) as a function of the ratio of extinction coefficient in the high extinction coefficient state (in this case a crystalline state) to the extinction coefficient in the low extinction coefficient state (in this case an amorphous state). The horizontal broken line arrows indicate the performances of the best prior art devices known to the inventors. The hatched region shows the region in which embodiments of the present disclosure operate. Reflectivity and contrast are both improved relative to the best prior art device known to the inventors.

Figure 3:
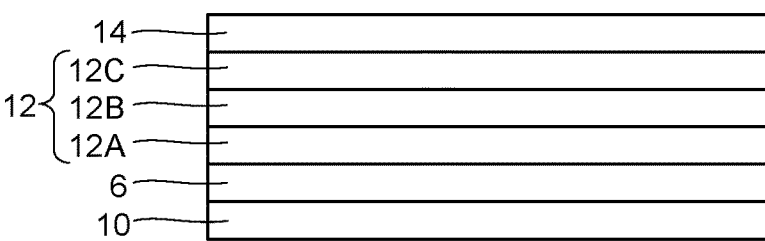
FIG. 3 is a schematic side sectional view showing an example pixel element layered structure having a single PCM layer and a composite spacer layer.
Figure 4:
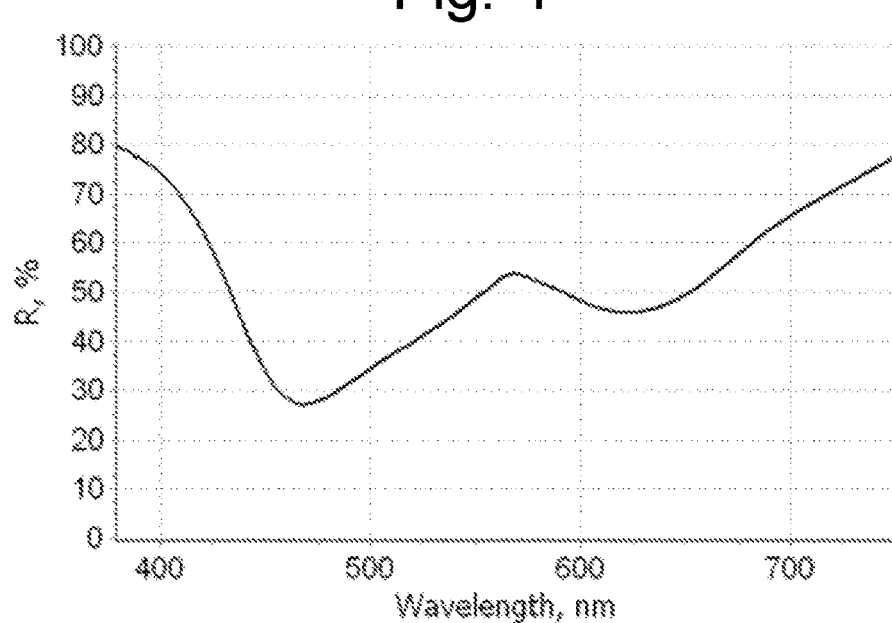
FIG. 4 is a graph depicting simulated reflectivity as a function of wavelength when the PCM layer of the arrangement of FIG. 3 is in a low extinction coefficient state.
Figure 5:
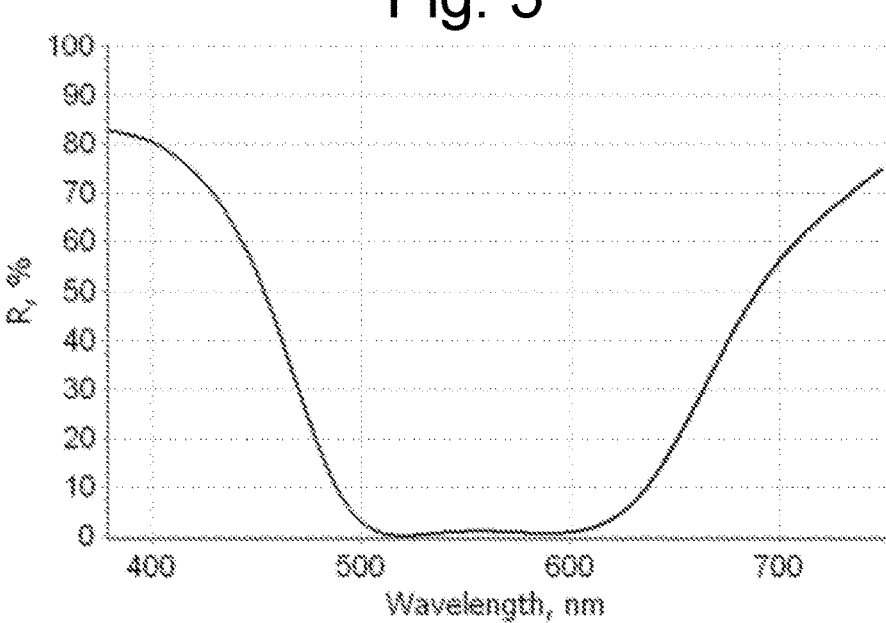
FIG. 5 is a graph depicting simulated reflectivity as a function of wavelength when the PCM layer of the arrangement of FIG. 3 is in a high extinction coefficient state.

FIG. 3 depicts an example configuration in which the layered structure of a pixel element 4 comprises the following sequence of layers: a reflective layer 10 consisting of 100 nm of Ag; a PCM layer 6 consisting of 23.8 nm of Sb$_2$S$_3$; a passive spacer layer 12 comprising a spacer sub-layer 12A consisting of 21 nm of Ag, a spacer sub-layer 12B consisting of 78 nm of ZnS—SiO$_2$, and a spacer sub-layer 12C consisting of 22 nm of Ag; and a capping layer 14 consisting of 43 nm of ZnS—SiO$_2$. FIG. 4 is a graph depicting simulated reflectivity as a function of wavelength when the PCM layer 6 is in the low extinction coefficient state. FIG. 5 is a graph depicting simulated reflectivity as a function of wavelength when the PCM layer 6 is in the high extinction coefficient state. A reflectivity in the low extinction coefficient state was found to be 46. A contrast between the low extinction coefficient state and the high extinction coefficient state was found to be 15.3.

Figure 6:
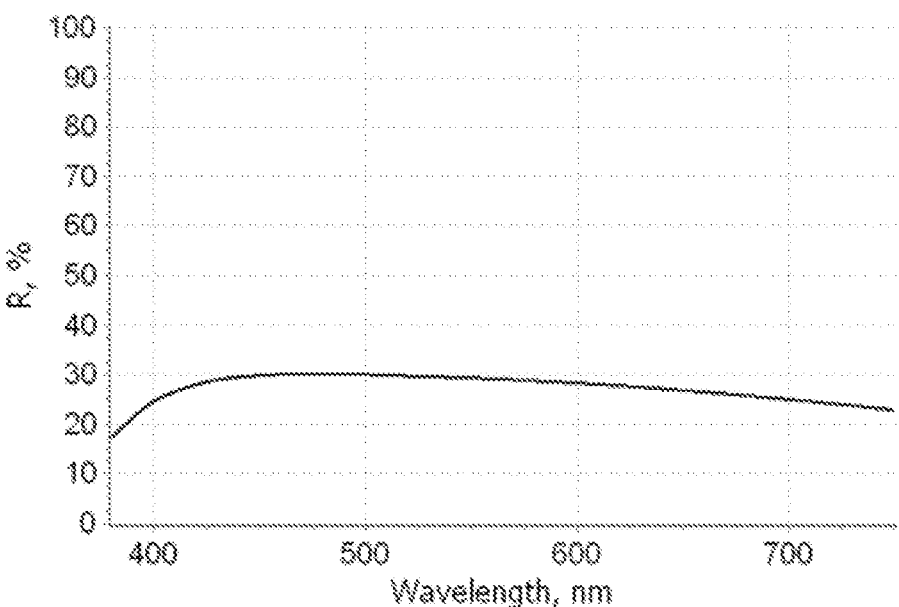
FIGS. 6 and 7 are graphs corresponding respectively to the graphs of FIGS. 4 and 5 for a case where a standard PCM-based pixel element is optimized as much as possible to achieve similar functionality.
Figure 7:
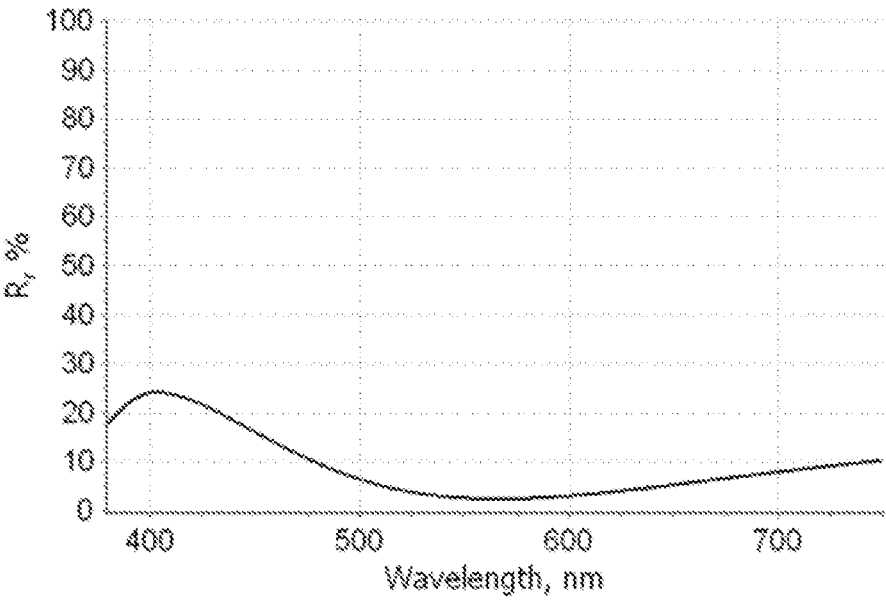

FIGS. 6 and 7 are graphs corresponding respectively to the graphs of FIGS. 4 and 5 for the case where a standard PCM-based pixel element is optimized as much as possible to achieve similar functionality. In this case, the resulting (optimized) sequence of layers was as follows: 100 nm Ag; 38 nm ZnS—SiO$_2$; 9 nm Ge$_2$Sb$_2$Te$_5$ PCM; 37 nm ZnS—SiO$_2$ capping. A reflectivity in the low extinction coefficient state was found to be 29. A contrast between the two states of the PCM was found to be 7.8.

In the example of FIGS. 3-5 discussed above, the layered structure of the pixel element 4 comprised only a single PCM layer 6. In other embodiments, the layered structure of the pixel element 4 comprises one or more further PCM layers (i.e. such that there is one PCM layer 6 and one or more further PCM layers 6). Each further PCM layer 6 is switchable between at least a high extinction coefficient state and a low extinction coefficient state. For each further PCM layer 6, a ratio of a mean average over the visible spectrum of the extinction coefficient of the further PCM layer 6 in the high extinction coefficient state to a mean average over the visible spectrum of the extinction coefficient of the further PCM layer 6 in the low extinction coefficient state is greater than 3.0 (optionally greater than 4.0, optionally greater than 5.0, optionally greater than 7.5, optionally greater than 10.0).

In such embodiments (having plural PCM layers 6), the switching arrangement (e.g. comprising heating elements 8) may be configured to apply heating to the pixel element 4 according to each of a plurality of different heating profiles. Thus, the switching arrangement is capable of selectively applying each and every one of the heating profiles. Each heating profile may define a variation of power as a function of time provided by a heating element 8 of the pixel element 4. Different heating profiles may last for different periods of time and/or involve different average powers and/or different shapes of power versus time (square wave pulse, ramping up, ramping down, oscillatory, etc.). Applying different heating profiles allows selective switching between different phases, such as to selectively switch the PCM from amorphous to crystalline or from crystalline to amorphous. For example, a control signal comprising a current pulse of relatively low amplitude and long duration may be effective for switching the PCM from an amorphous state to a crystalline state, the resulting heating profile being such that the PCM is heated to a temperature higher than the crystallization temperature T$_C$ of the PCM, but less than the melting temperature T$_M$ of the PCM. The temperature is maintained above the crystallization temperature T$_C$ for a time sufficient to crystallize the PCM. A control signal comprising a current pulse of higher amplitude but shorter duration may be effective for switching the PCM from a crystalline state to an amorphous state, the resulting heating profile being such that the PCM is heated to a temperature that is higher than the melting temperature T$_M$, causing melting of the PCM, but is cooled sufficiently quickly that re-crystallization does not occur excessively and the PCM freezes into an amorphous state. After the heating of the PCM has finished the PCM remains in the stable state selected (e.g. amorphous or crystalline) until further heating is applied. Thus, when based on PCM the pixel region is naturally held in a given optical state without application of any signal, and can thus operate with significantly less power than other display technologies. Switching can be performed an effectively limitless number of times. The switching speed is also very rapid, typically less than 300 ns, and certainly several orders faster than the human eye can perceive.

In an embodiment, within each pixel element 4, each PCM layer 6 is in thermal contact with each other PCM layer 6 (of the same pixel element 4). The thermal contact is such that the heating provided by the switching arrangement causes a substantially identical variation of temperature during the heating in each of the PCM layers 6 in the pixel element 4. The different PCM layers 6 are configured, however, so that each heating profile can have a different effect on different PCM layers 6 (e.g. to switch or not to switch each PCM layer 6). For example, in some embodiments, the plurality of heating profiles comprises a heating profile that causes switching of a first of the PCM layers 6 without switching of at least a second of the PCM layers 6 in the pixel element 4. In some embodiments, the plurality of heating profiles comprises a heating profile that causes switching of the second PCM layer 6 without switching of the first PCM layer 6. Similarly, the plurality of heating profiles may be configured so that there is a heating profile that can simultaneously cause switching of two or more of the PCM layers 6 from the high extinction coefficient state to the low extinction coefficient state and a heating profile that simultaneously causes switching of two or more of the PCM layers from the low extinction coefficient state to the high extinction coefficient state. The ability to selectively switch different combinations of the PCM layers 6 may be achieved for example by arranging for the different PCM layers 6 to have suitably different transition temperatures (e.g. different melting points, crystallization temperatures, etc.). A wide range of combinations of switched states for the PCM layers 6 can thereby be achieved without any corresponding increase in the complexity of the switching arrangement. The switching arrangement may, for example, still comprise a single heating element 8 per pixel element 8 and the different switching functionalities be achieved simply by varying the heating profile provided by the heating element 8 (e.g. by varying an average power and/or duration of the heating).

The wide range of combinations of switched states in the plural PCM layers 6 allows a corresponding wide range of optical effects. In particular, in addition to control of a black/white level, control of colour may be provided.

Figure 8:
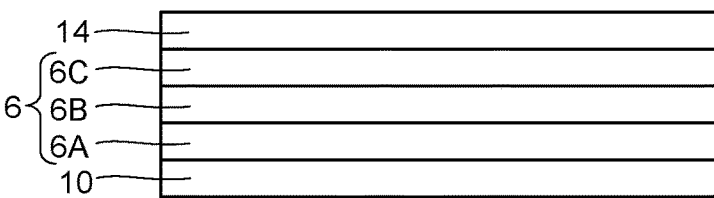
FIG. 8 is a schematic side sectional view showing an example pixel element layered structure having multiple PCM layers.
Figure 9:
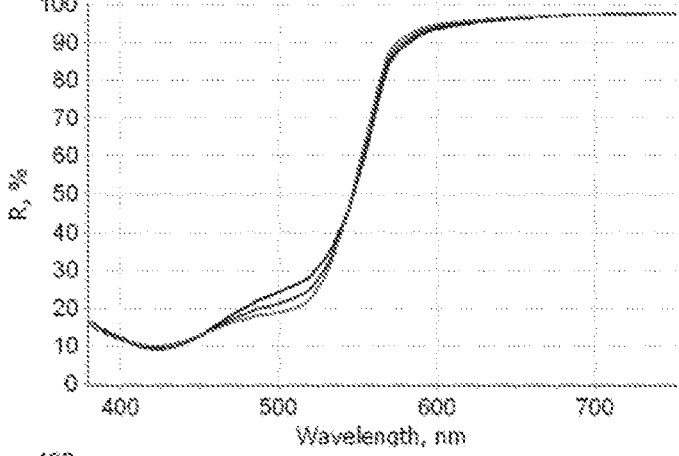
FIG. 9 depicts a simulated variation of reflectivity against wavelength for a pale state of the arrangement of FIG. 8.

FIG. 8 depicts an example configuration in which three PCM layers 6 are provided. In this particular example, the layered structure comprises the following sequence of layers: a reflective layer 10 consisting of 100 nm of Ag; a first PCM layer 6A consisting of 18 nm of $Sb_2S_3$; a second PCM layer 6B consisting of 40 nm of $Sb_2S_3$ (with a different doping to the first PCM layer 6A); a third PCM layer 6C consisting of 14 nm of $Sb_2S_3$ (with the same doping as the first PCM layer 6A); and a capping layer 14 consisting of 49 nm of ZnS—$SiO_2$. This configuration provides a pixel element 4 that can be switched between a pale state, a red state, and a black state. FIG. 9 depicts a simulated variation of reflectivity against wavelength for the pale state (with all three PCM layers 6A-6C switched to an amorphous state).

Figure 10:
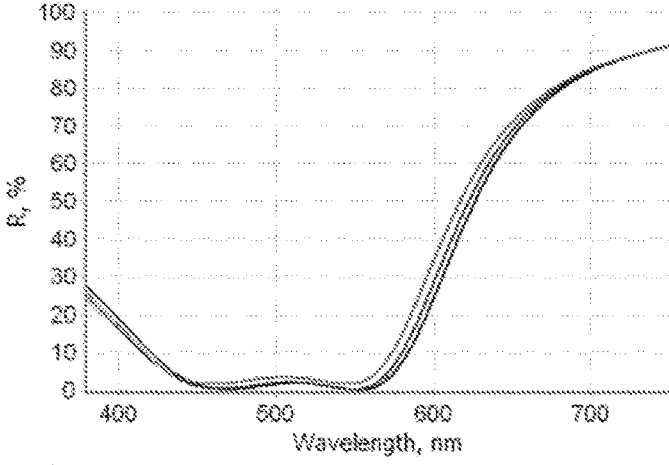
FIG. 10 depicts a simulated variation of reflectivity against wavelength for a red state of the arrangement of FIG. 8.
Figure 11:
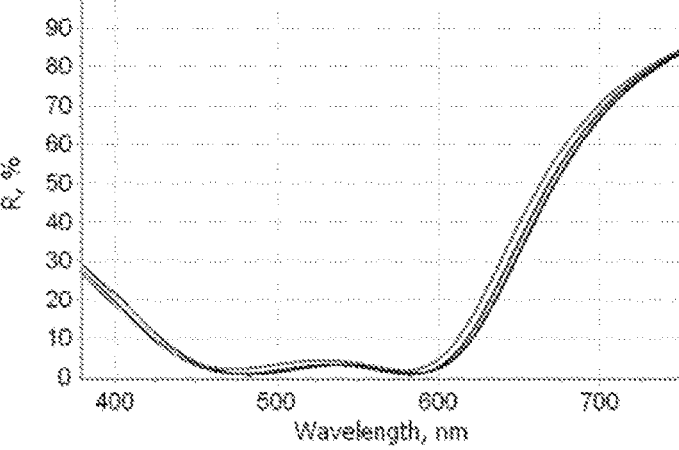
FIG. 11 depicts a simulated variation of reflectivity against wavelength for a black state of the arrangement of FIG. 8.

FIG. 10 depicts a simulated variation of reflectivity against wavelength for the red state (with PCM layer 6A and 6C in a crystalline state and the PCM layer 6B in the amorphous state). FIG. 11 depicts a simulated variation of reflectivity against wavelength for the black state (with all three PCM layers 6A-6C switched to the crystalline state). The three different curves in each graph correspond to different angles of reflection (0 degrees, 45 degrees, and 60 degrees). The pale state reflectivity (FIG. 9) was found to be 61.5. The black/white contrast (comparing FIGS. 9 and 11) was found to be 16.6.

The arrangement of FIG. 8 exemplifies a case where the layered structure comprises two identical PCM layers and a different PCM layer positioned in between them.

The arrangement of FIG. 8 further exemplifies a case where the two or more PCM layers 6 in a pixel element 4 differ from each other only by doping (e.g. by virtue of an amount of doping or a difference in composition of the doping). The skilled person would be aware of various studies showing how properties of PCMs relevant to their switching can be varied by doping and would therefore be able to select suitable doping for the particular PCM being used. As illustrative examples, reference is made to Kojima et al. (Rie Kojima et al 1998 Jpn. J. Appl. Phys. 37 2098), which shows variation of crystallization temperature in GeSbTe films as a function of doping with N. Further reference is made to G Betti Beneventi et al. ("Carbon-doped GeTe Phase-Change Memory featuring remarkable RESET current reduction", Solid-State Device Research Conference (ESSDERC), 2010 Proceedings of the European; 313-316; 2010/9/14), which shows variation in the properties of GeTe PCM as a function of doping with C.

Each of one or more of the PCM layers 6 may comprise, consist essentially of, or consist of, one or more of the following in any combination: $Sb_2S_3$; $Ge_2Sb_2Se_4Te$; GeSb-TeO; GeSnTeO; GeSnSbTeO; TeBiSnN; TeBiSnS; TeBi-SnO; SeSnBi; SeSnBiO; SeSnGeO. In some embodiments, each of one or more of the PCM layers 6 may comprise, consist essentially of, or consist of $AgSbSe_2$. AgSbTe2 is one of the most superior PCM alloys for high speed PC optical disks, showing very fast crystallization speed, good cyclability, and low melting temperature (552 C). The large optical absorption of the composition at blue-violet wavelength would not be optimal for use as the PCM layer 6. On the other hand, $AgSbSe_2$, a p-type semiconductor, shows higher transmittance and lower crystallization speed with decent cyclability (although the melting temperature of 610 C is a bit higher than $AgSbTe_2$), and is therefore suitable for use as the PCM layer 6. Related compositions, which may have lower melting points, may also be used, such as $(Ag_2Se)_{1-x}(Sb_2Se_3)_x$ wherein, preferably, $0.5 \leq x$ or $0.5 \leq x < 0.7$.

Furthermore, $AgSbSe_2$ and $AgSbTe_2$ have similar rocksalt type crystal structures and can be easily mixed. The mixture between two alloys provides further options for the PCM layer 6. For example, $AgSbTe_{2-y}Se_y$ may be used, wherein, preferably, $2 \geq y \geq 0.5$.

Additionally, it is known that $AgBiTe_2$ and $AgBiSe_2$ also have similar rocksalt structures to that of $AgSbSe_2$. Thus, $Ag(Sb_{1-z}Bi_z)Te_{2-y}Se_y$ may also be used, wherein, preferably, $2 \geq y \geq 0.5$ and/or $1 \geq z \geq 0$.

In view of the above, each of one or more of the PCM layers 6 may therefore comprise, consist essentially of, or consist of, one or more of the following in any combination:

$(Ag_2Se)_{1-x}(Sb_2Se_3)_x$ wherein, preferably, $0.5 \leq x$;

$(Ag_2Se)_{1-x}(Sb_2Se_3)_x$ wherein, preferably, $0.5 \leq x < 0.7$;

$AgSbSe_2$;

AgSbTe$_{2-y}$Se$_y$ wherein, preferably, $2 \geq y \geq 0.5$; and

Ag(Sb$_{1-z}$Bi$_z$)Te$_{2-y}$Se$_y$ wherein, preferably, $2 \geq y \geq 0.5$ and/or $1 \geq z \geq 0$.

Other materials that can be used for the PCM layers 6 including the following, in any combination:

(Te$_{80}$Sn$_{15}$Ge$_5$)$_{1-x}$S$_x$ wherein, preferably, $0 \leq x \leq 0.2$;

(Te$_{80}$Sn$_{15}$Ge$_5$)$_{1-x}$Se$_x$ wherein, preferably, $0 \leq x \leq 0.4$;

(Te$_{80}$Sn$_{15}$Bi$_5$)$_{1-x}$S$_x$ wherein, preferably, $0 \leq x \leq 0.2$; and (Te$_{80}$Sn$_{15}$Bi$_5$)$_{1-x}$Se$_x$ wherein, preferably, $0 \leq x \leq 0.4$.

Figure 12:
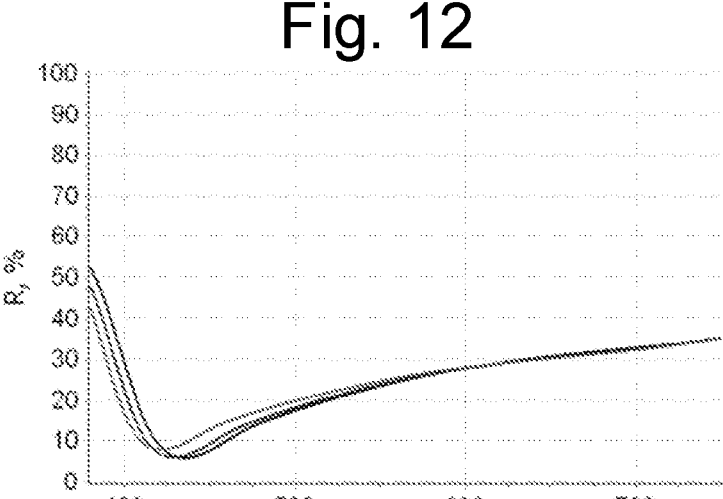
FIGS. 12-14 are graphs corresponding respectively to the graphs of FIGS. 9-11 for a case where a stack comprising standard PCM layers is optimized as much as possible to achieve similar functionality.
Figure 13:
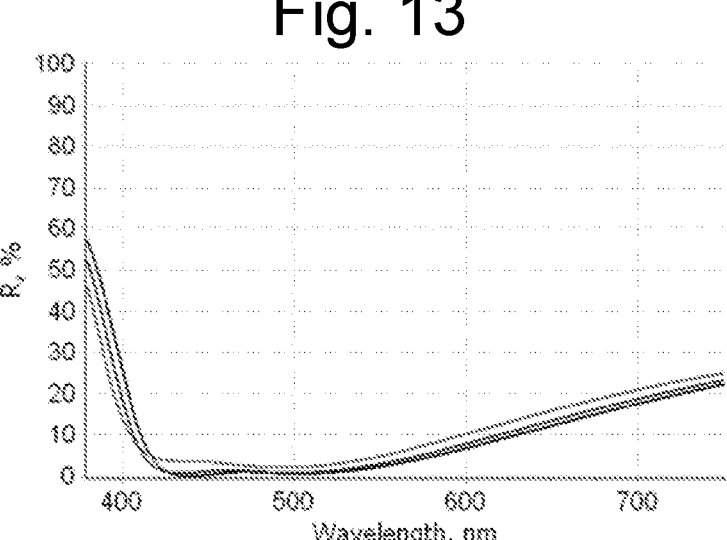
Figure 14:
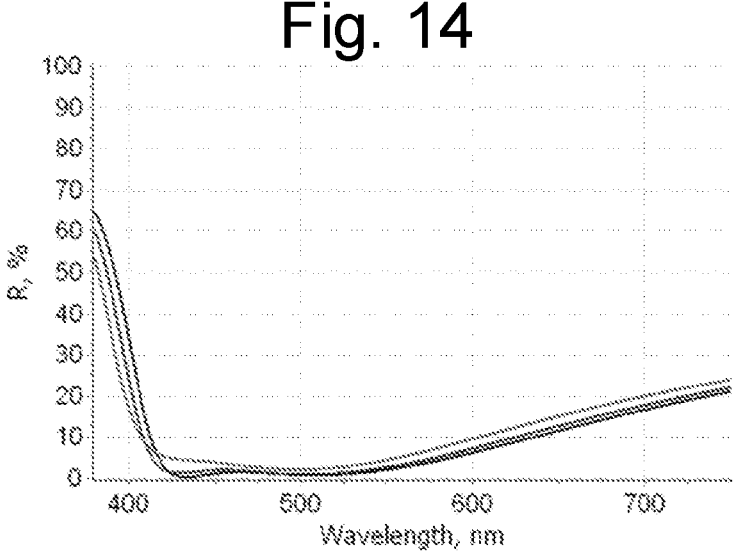

FIGS. 12-14 are graphs corresponding respectively to the graphs of FIGS. 9-11 for the case where a stack comprising standard PCM layers is optimized as much as possible to achieve similar functionality. In this case, the resulting (optimized) sequence of layers was as follows: 100 nm Ag; 166 nm ZnS—SiO$_2$; 12 nm PCM1; 29 nm PCM2; 20 nm Ag; 53 nm ZnS—SiO$_2$; 15 nm PCM1; 44 nm ZnS—SiO$_2$. The pale state reflectivity (FIG. 12, with PCM1 and PCM2 both in the amorphous state) was 23.4. The red state reflectivity (FIG. 13, with PCM1 crystalline and PCM2 amorphous) was 3.5. The black/white contrast (comparing FIGS. 12 and 14) was 7.

In still further embodiments, three different PCM layers 6 are provided in the pixel element 4. The three different PCM layers 6 are independently switchable to allow full colour control (e.g. to make available not only different shades of one colour such as red, as discussed above with reference to FIGS. 8-14, but to make available different shades of different colours, such as red, green and blue) and, independently of the full colour control, full reflectivity control.

In an embodiment, a shutter-like effect is achieved by arranging for the plurality of heating profiles to contain at least two heating profiles that cause switching of different proportions of the PCM in one of PCM layers 6 of a given pixel element 4 via heating from one and the same heating element 8 (dedicated to that pixel element 4). The switching of different proportions of the PCM layer 6 may be such as to cause the pixel element 4 in question to have different corresponding reflectivities. For example, the switching of different proportions may comprise switching different proportions of the PCM layer 6 from the amorphous state to the crystalline state (with higher proportions of the crystalline state typically corresponding to lower reflectivities) or vice versa. The different heating profiles may, for example, have different durations. Heating profiles with longer durations may be used to switch larger proportions of the PCM layer 6 between the different available states of the PCM layer 6. Heating profiles with shorter durations may be used to switch smaller proportions of the PCM layer 6. Heating using an electrical pulse can be considered as the equivalent of charging a "heat capacitor". A large pulse for a short time and a small pulse for a longer amount of time can be used to reach the same temperature.

Figure 15A:
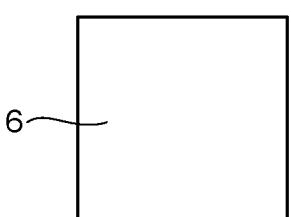
FIGS. 15A-15D are schematic top views of a pixel element showing progressive switching of a PCM layer in a direction towards a peripheral region of the pixel element.
Figure 15B:
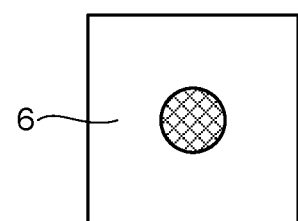
Figure 15C:
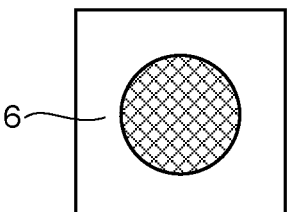
Figure 15D:
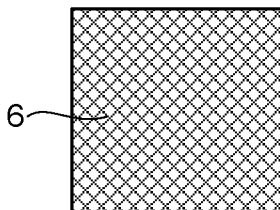

In some embodiments, the heating from the heating element 8 of a given pixel element 4 is applied substantially uniformly to the PCM layer 6 of that pixel element 4 and the switching of different proportions of the PCM layer 6 is achieved by arranging for different portions of the PCM layer 6 to lose heat at different respective rates. In some embodiments, this is achieved by arranging for the PCM layer 6 to lose heat more quickly from regions of the pixel element 8 that are peripheral when viewed perpendicularly to a plane of the PCM layer 6 than from other regions, such that switching of the PCM layer progresses outwardly towards the peripheral regions during application of a heating profile. An example arrangement of this type is depicted schematically in FIGS. 15A-15D. Here, FIG. 15A shows a PCM layer 6 of a single pixel element 4 before any heating profile has been applied. FIG. 15B shows the PCM layer 6 of FIG. 15A after application of a first heating profile. The first heating profile applies heating substantially uniformly to the PCM layer 6 but because the peripheral regions lose heat more quickly (e.g. by being nearer to cooler regions outside of the pixel element 4), only a central region is subjected to a sufficiently high temperature increase to be switched between different states of the PCM. Here, the hatched region represents PCM switched by the heating profile. FIG. 15C shows the PCM layer 6 of FIG. 15A after application of a second heating profile. Like the first heating profile, the second heating profile applies heating substantially uniformly to the PCM layer 6 with the peripheral regions losing heat more quickly than other regions. However, because the second heating profile involves application of the heating for a longer duration (and/or at a higher power) a greater proportion of the PCM layer 6 is switched. FIG. 15D shows the case where a heating profile applied to the PCM layer 6 of FIG. 15A is sufficient to completely switch all of the PCM in the PCM layer 6 of the pixel element 4. The design of the heating element defines what pulse switches what area. One can design heating elements that switch 50% of the area for a certain pulse and 100% of the area for a longer or higher amplitude pulse. In some embodiments, a heat sink structure may be providing around the peripheries of the pixel elements 4 to help with the peripheral cooling and/or to prevent leakage of heat from one pixel element 4 to a neighbouring pixel element 4.

An effect analogous to that described above with reference to FIGS. 15A-15D can be achieved by arranging for the heating to be applied non-uniformly to the PCM layer 6. The non-uniform heating is controlled to promote switching of different portions of the phase PCM layer 6 at different rates during the heating by the heating element 8. Non-uniform heating can be achieved in various ways. For example, the heating element 8 can be configured to apply heating over an area that is significantly smaller than the PCM layer 6 in the pixel element 4. For example, viewed perpendicularly to a plane of the PCM layer 6, the heating element 8 may comprise a resistive heater having a surface area that is less than 75%, optionally less than 50%, optionally less than 25%, of the surface area of the PCM layer 6 in the pixel element 4. In some embodiments, the heating element 8 in each pixel element 4 comprises a plurality of parallel strips to apply a venetian blind like effect.

In some embodiments, grayscale is controlled by controlling groups of pixel elements 4. The switching arrangement in such cases may be configured to switch each of the groups of adjacent pixel elements 4 between a predetermined set of group switching states. Each group switching state defines a different combination of pixel states of the pixel elements 4 in the group of pixel elements 4. Each pixel state is defined by whether each of the PCM layers 4 in the pixel element 4 is in the high extinction coefficient state or the low extinction coefficient. The set of group switching states may allow the group to be controlled to have a plurality of different reflectivities without changing the colour of the group.

Figure 16A:
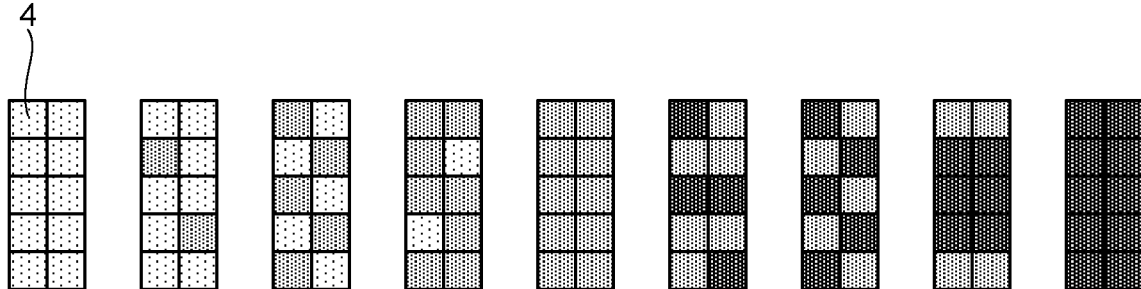
FIGS. 16A-16C depict three example sets of group switching states that allow a group of pixel elements to be switched to achieve different overall reflectivities without changing a colour displayed by the group.
Figure 16B:
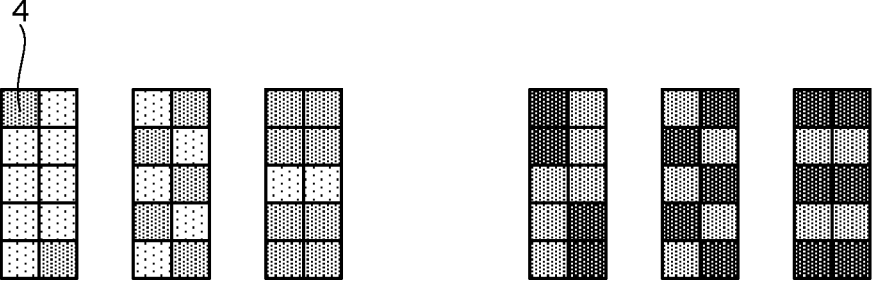
Figure 16C:
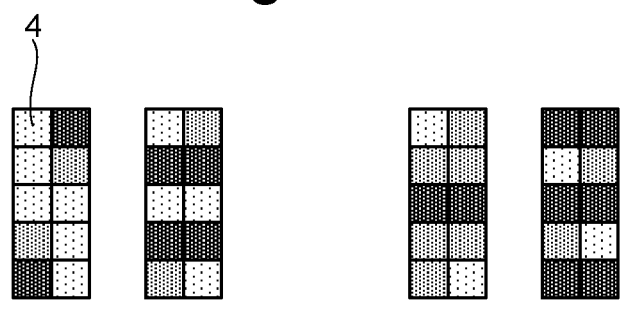

FIGS. 16A-16C depict three example sets of group switching states. Each group of pixel elements 4 in these examples contains ten pixel elements 4 (each having 5 rows and 2 columns). In one particular implementation, each pixel element 4 has a surface area of 50 microns by 40 microns, which yields a total surface area for each group of 250 microns by 80 microns. The set of FIG. 16A contains eight group switching states, with each pixel element 4 being switchable between a plurality of pixel states. In the example shown, three exemplary pixel states are depicted (e.g. a white state, a vivid state, and a dark state), but each pixel element 4 may be configured to be switchable between a larger number of different states as described above. The set of FIG. 16B contains six group switching states using the same pixel elements 4 as FIG. 16A. The set of FIG. 16C contains four group switching states using the same pixel elements 4 as FIGS. 16A and 16B. Higher or lower levels of grayscale granularity can be obtained by making available different numbers of group switching states. Various algorithms may be used for defining the different combinations of pixel states for each grayscale level. FIGS. 16A-16C show exemplary arrangements for demonstrating the principle, with a grayscale level increasing progressively (i.e. becoming darker) from left to right, optionally with a vivid state in the middle (FIG. 16A).

The invention claimed is:

1. A display device for displaying a pattern, comprising a pixel element having a layered structure comprising three different phase change material layers, wherein each of the three different phase change material layers are switchable between a high extinction coefficient state and a low extinction coefficient state, and wherein two or more of the three different phase change material layers differ from each other only by doping, wherein preferably the doping comprises either or both of oxygen and nitrogen as dopant, and wherein at least one phase change material layer is thermally switchable between a stable high extinction coefficient state and a stable low extinction coefficient state, wherein, for the at least one phase change material layer:

a ratio of a mean average, over the visible spectrum, of the extinction coefficient of the at least one phase change material layer in the stable high extinction coefficient state to a mean average, over the visible spectrum, of the extinction coefficient of the at least one phase change material layer in the stable low extinction coefficient state is greater than 3.0; and the mean average, over the visible spectrum, of the extinction coefficient of the at least one phase change material layer in the stable high extinction state is less than 1.0.

2. The device of claim 1, further comprising a switching arrangement capable of applying heating to the pixel element according to each of a plurality of different heating profiles.

3. The device of claim 2, wherein, within the pixel element, each phase change material layer is in thermal contact with the other phase change material layers such that applying heating causes a substantially identical variation of temperature in each of the phase change material layers in the pixel element.

4. The device of claim 2, wherein each of the three different phase change material layers has a heating profile, and a heating profile of one of the three different phase change material layers allows switching of that phase change material layer without switching of the other two phase change material layers in the pixel element.

5. The device of claim 1, wherein the three different phase change material layers are configured to be independently switchable to allow full colour control and, independently of the full colour control, full reflectivity control.

6. The device of claim 1, wherein each of one or more of the phase change material layers comprises one or more of the following:

$(Ag_2Se)_{1-x}(Sb_2Se_3)_x$ wherein, preferably, 0.5<x;
$(Ag_2Se)_{1-x}(Sb_2Se_3)_x$ wherein, preferably, 0.5<x<0.7;
$AgSbSe_2$;

$AgSbTe_{2-y}Se_y$ wherein, preferably, 2>y>0.5;
$Ag(Sb_{1-z}Bi_z)Te_{2-y}Se_y$ wherein, preferably, 2>y>0.5 and 1>z>0;
$(Te_{80}Sn_{15}Ge_5)_{1-x}S_x$ wherein, preferably, 0<x<0.2;
$(Te_{80}Sn_{15}Ge_5)_{1-x}Se_x$ wherein, preferably, 0<x<0.4;
$(Te_{80}Sn_{15}Bi_5)_{1-x}S_x$ wherein, preferably, 0<x<0.2;
$(Te_{80}Sn_{15}Bi_5)_{1-x}Se_x$ wherein, preferably, 0<x<0.4.

7. The device of claim 1, wherein each of one or more of the phase change material layers comprises one or more of the following: $Sb_2S_3$; $Ge_2Sb_2Se_4Te$; GeSbTeO; GeSnTeO; GeSnSbTeO; TeBiSnN; TeBiSnS; TeBiSnO; SeSnBi; SeSnBiO; SeSnGeO.

8. The device of claim 1, wherein the high extinction coefficient state is substantially crystalline and the low extinction coefficient state is substantially amorphous.

9. The device of claim 1, wherein the pixel element further comprises a reflective layer.

10. The device of claim 9, wherein the pixel element further comprises a passive spacer layer.

11. A display device for displaying a pattern, comprising a pixel element having a layered structure including two identical phase change material layers and a different phase change material layer positioned in between the two identical phase change material layers, the layered structure comprising at least one phase change material layer that is thermally switchable between a stable high extinction coefficient state and a stable low extinction coefficient state, wherein, for the at least one phase change material layer:

a ratio of: a mean average, over the visible spectrum, of the extinction coefficient of the phase change material layer in the stable high extinction coefficient state to a mean average, over the visible spectrum, of the extinction coefficient of the phase change material layer in the stable low extinction coefficient state is greater than 3.0; and the mean average, over the visible spectrum, of the extinction coefficient of the phase change material layer in the stable high extinction state is less than 1.0.

12. The device of claim 11, wherein the two identical phase change material layers and the different phase change material layer differ from each other only by doping, wherein preferably the doping comprises either or both of oxygen and nitrogen as dopant.

13. The device of claim 11, wherein each of one or more of the phase change material layers comprises one or more of the following:

$(Ag_2Se)_{1-x}(Sb_2Se_3)_x$ wherein, preferably, 0.5<x;
$(Ag_2Se)_{1-x}(Sb_2Se_3)_x$ wherein, preferably, 0.5<x<0.7;
$AgSbSe_2$;
$AgSbTe_{2-y}Se_y$ wherein, preferably, 2>y>0.5;
$Ag(Sb_{1-z}Bi_z)Te_{2-y}Se_y$ wherein, preferably, 2>y>0.5 and 1>z>0;
$(Te_{80}Sn_{15}Ge_5)_{1-x}S_x$ wherein, preferably, 0<x<0.2;
$(Te_{80}Sn_{15}Ge_5)_{1-x}Se_x$ wherein, preferably, 0<x<0.4;
$(Te_{80}Sn_{15}Bi_5)_{1-x}S_x$ wherein, preferably, 0<x<0.2;
$(Te_{80}Sn_{15}Bi_5)_{1-x}Se_x$ wherein, preferably, 0<x<0.4.

14. The device of claim 11, wherein each of one or more of the phase change material layers comprises one or more of the following: $Sb_2S_3$; $Ge_2Sb_2Se_4Te$; GeSbTeO; GeSnTeO; GeSnSbTeO; TeBiSnN; TeBiSnS; TeBiSnO; SeSnBi; SeSnBiO; SeSnGeO.

15. The device of claim 11, wherein the high extinction coefficient state is substantially crystalline and the low extinction coefficient state is substantially amorphous.

16. The device of claim 11, wherein the pixel element further comprises a reflective layer.

17. The device of claim 16, wherein the pixel element further comprises a passive spacer layer.

\* \* \* \* \*